US012246564B2

(12) United States Patent
Tette et al.

(10) Patent No.: US 12,246,564 B2
(45) Date of Patent: Mar. 11, 2025

(54) DISABLED VEHICLE MOVING DEVICE INCLUDING FLEXIBLE TIRE SLEEVE AND COVER

(71) Applicant: GM GLOBAL TECHNOLOGY OPERATIONS LLC, Detroit, MI (US)

(72) Inventors: Robert Kosi Tette, Oak Park, MI (US); Ryan O. Brown, Columbia, TN (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 583 days.

(21) Appl. No.: 17/709,617

(22) Filed: Mar. 31, 2022

(65) Prior Publication Data

US 2023/0311594 A1 Oct. 5, 2023

(51) Int. Cl.

*B60C 27/16* (2006.01)
*B60C 19/00* (2006.01)
*B60C 27/02* (2006.01)

(52) U.S. Cl.

CPC .............. *B60C 27/16* (2013.01); *B60C 19/00* (2013.01); *B60C 27/0238* (2013.01)

(58) Field of Classification Search

CPC . B60C 27/02; B60C 27/0238; B60C 27/0261; B60C 27/062; B60C 27/064; B60C 27/16; B60C 19/00

See application file for complete search history.

(56) References Cited

U.S. PATENT DOCUMENTS

| | | | | |
|---|---|---|---|---|
| 2,472,331 A * | 6/1949 | Koehler | B60C 27/02 152/208 |
| 10,065,458 B2 * | 9/2018 | Tsai | B60C 13/002 |
| 2004/0206436 A1 * | 10/2004 | Ferguson | B60C 11/16 152/217 |
| 2005/0263228 A1 * | 12/2005 | Martin | B60C 19/00 152/170 |
| 2007/0074796 A1 * | 4/2007 | Martin | B60J 11/10 152/185 |
| 2008/0190531 A1 * | 8/2008 | Holeyfield | B60C 27/02 152/208 |

* cited by examiner

*Primary Examiner* — Jason R Bellinger

(57) ABSTRACT

A disabled vehicle moving device configured to allow movement of a vehicle includes a sleeve made of a flexible material and configured to be mounted over a radially outer surface of a tire/wheel assembly of the vehicle that is locked for rotation. A cover is made of a flexible material and configured to be mounted over the sleeve and the tire/wheel assembly of the vehicle. A lubricant is arranged between the sleeve and the cover. The cover rotates relative to the sleeve and the tire/wheel assembly to allow the vehicle to be moved.

20 Claims, 2 Drawing Sheets

DISABLED VEHICLE MOVING DEVICE INCLUDING FLEXIBLE TIRE SLEEVE AND COVER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to devices for moving disabled vehicles having one or more locked wheels, and more particularly to a disabled vehicle moving device including a flexible tire sleeve, a cover and lubricant located therebetween.

A disabled vehicle with one or more locked wheels may be difficult to move. For example, some vehicles are equipped with an electronic transmission range selector (ETRS). The vehicle may need to be turned on or operational to allow the wheels of the vehicle to be rotated. Other vehicles may include an electronic parking brake that requires battery power to be released. Still other vehicles may be inaccessible due to an absent owner or an inoperable keyless entry system. Moving the disabled vehicle with locked wheels is very difficult and may cause vehicle damage.

SUMMARY

A disabled vehicle moving device configured to allow movement of a vehicle includes a sleeve made of a flexible material and configured to be mounted over a radially outer surface of a tire/wheel assembly of the vehicle that is locked for rotation. A cover is made of a flexible material and configured to be mounted over the sleeve and the tire/wheel assembly of the vehicle. A lubricant is arranged between the sleeve and the cover. The cover rotates relative to the sleeve and the tire/wheel assembly to allow the vehicle to be moved.

In other features, the sleeve comprises a flexible material having an open cylindrical shape. The sleeve comprises a flexible material having a rectangular shape and an attaching device to connect opposite ends of the sleeve around the radial outer surface of the tire/wheel assembly. The cover includes a rectangular-shaped flexible material. The cover includes first and second ends and first and second sides, and further comprising a connecting device located on at least one of the first end and the second end of the cover to connect the first end and the second end of the cover together around the tire/wheel assembly.

In other features, the connecting device comprises first and second mating connectors connected to the first end and to the second end of the cover, respectively. The first and second mating connectors are selected from a group consisting of a zipper, a hook and loop fastener, and snaps. The cover further comprises a tightening device configured to tighten the cover around the tire/wheel assembly. The tightening device comprises first and second collars located along sides of the cover and first and second strings arranged in the first and second collars, respectively. At least one of the sleeve and the cover is made of a material selected from a group consisting of vinyl and plastic.

A method for moving a disabled vehicle including at least one locked wheel includes mounting a sleeve made of a flexible material over a radially outer surface of a tire/wheel assembly of the disabled vehicle that is locked for rotation; applying a lubricant to the sleeve; arranging a cover made of a flexible material over the sleeve and the tire/wheel assembly of the disabled vehicle; and moving the disabled vehicle. The cover rotates relative to the sleeve and the tire/wheel assembly during movement.

In other features, the sleeve comprises a flexible material having an open cylindrical shape. The sleeve comprises a flexible material having a rectangular shape and further comprising connecting opposite ends of the sleeve around the radial outer surface of the tire/wheel assembly. The cover includes a rectangular-shaped flexible material.

In other features, the method includes connecting opposite ends of the cover together around the tire/wheel assembly. The method includes connecting the opposite ends of the cover together around the tire/wheel assembly comprises connecting first and second mating connectors attached to opposite ends of the cover together. The first and second mating connectors are selected from a group consisting of a zipper, a hook and loop fastener, and snaps. The method includes tightening the cover around the tire/wheel assembly. The cover includes first and second collars arranged along first and second sides thereof, respectively, and the tightening comprises tying first and second strings arranged in the first and second collars, respectively, together. At least one of the sleeve and the cover is made of a material selected from a group consisting of vinyl and plastic.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A disabled vehicle moving device according to the present disclosure allows a vehicle with one or more locked wheels to be moved over relatively short distances without unlocking the wheels. The disabled vehicle moving device includes a sleeve that is arranged over a tire/wheel assembly of the vehicle. A cover is arranged over the sleeve. Lubricant is applied to the sleeve prior to closing the cover around the sleeve and tire/wheel assembly. The cover is closed and/or tightened to the tire/wheel assembly. Additional disabled vehicle moving devices may be attached to other locked tire/wheel assemblies of the vehicle. Then, the disabled vehicle can be pushed or moved with significantly reduced friction due to the lubricant between the cover (that rotates along the road surface) and the sleeve (that stays stationary with the corresponding tire/wheel assembly). After the vehicle is moved, the disabled vehicle moving devices are removed from the tire/wheel assemblies.

Figure 1:
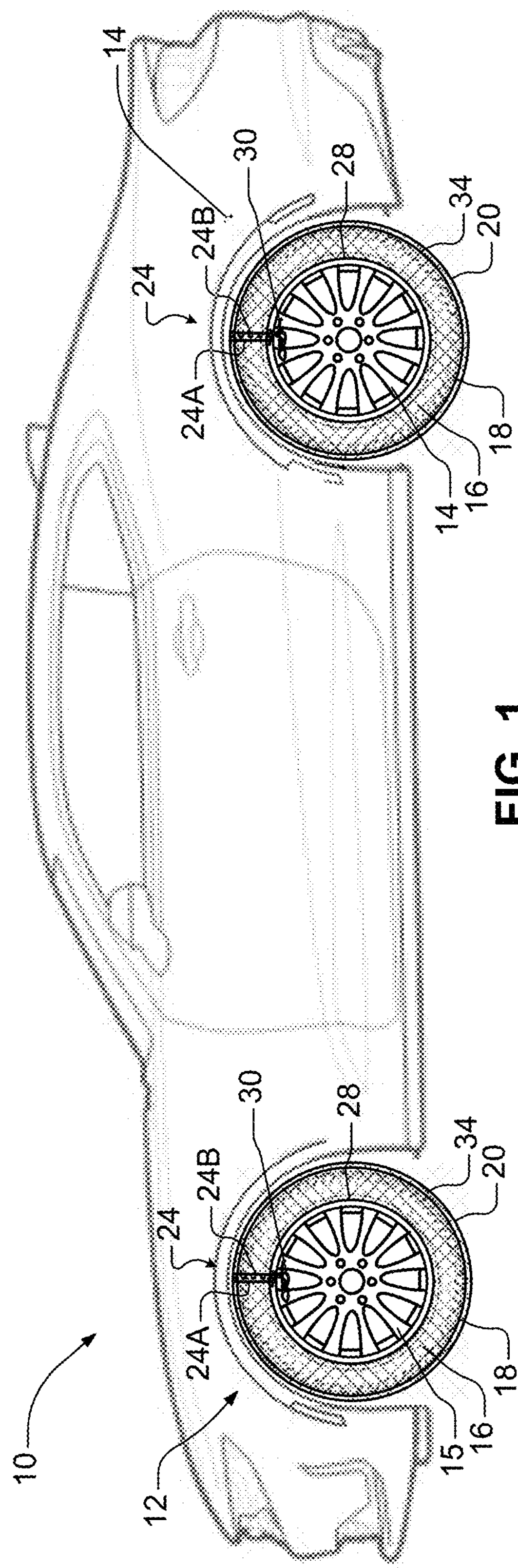
FIG. 1 is a side view of a disabled vehicle including an example of a disabled vehicle moving device according to the present disclosure that is attached to one or more wheels of the disabled vehicle.

Referring now to FIG. 1, a vehicle 10 including one or more disabled vehicle moving devices 12 and 14 that are attached to one or more wheels of the disabled vehicle 10 that are locked. The disabled vehicle 10 includes tires 16 that are mounted on wheels 15 (e.g. tire/wheel assemblies). The disabled vehicle moving device 12 includes a sleeve 18 that is arranged adjacent to a radially outer surface of the tire 16. A cover 20 is arranged over the sleeve 18 and the tire 16. In some examples, the sleeve 18 and the cover 20 are made of flexible materials such as vinyl, plastic, fabric, or other suitable materials.

In some examples, the cover 20 includes a connecting device 24 attaching opposite ends of the cover 20 together. In some examples, the connecting device 24 includes mating connectors 24A and 24B. Examples of the mating connectors 24A and 24B include a zipper, a hook and loop fastener such as Velcro, a plurality of snaps with male and female snap connectors, and/or other types of mating connectors. In some examples, the connecting device 24 includes one or more adhesive strips arranged on one or both ends of the cover 20 to attach the ends of the cover 20 together. In other examples, adhesive can be used to attach the ends of the cover 20 together and the cover 20 can be removed by cutting it off.

In some examples, the cover 20 includes a tightening device 27 to tighten the cover 20 around an outer circumference of the tire 16. In other examples, the tightening device 27 is omitted.

In some examples, collars 28 are formed on opposite side surfaces of the cover 20 and strings 30 are arranged in the collars 28 and extend from opposite ends of the collars 28. After mounting the cover 20 over the sleeve 18 and the tire 16, opposite sides of the connecting device 24 are connected together and opposite ends of the string 30 are pulled tight and tied together. In some examples, the cover 20 is secured by zipping the mating ends of a zipper together and tying ends of the strings 30 together to avoid interference with the vehicle knuckle and suspension components.

The disabled vehicle moving device 12, 14 according to the present disclosure provides one or more non-intrusive, low friction rolling surfaces to facilitate movement of the disabled vehicle 10. The sleeve 18 and the cover 20 are lubricated by lubricant 34 to reduce friction and to allow the vehicle to be moved. The sleeve 18 and the cover 20 of the disabled vehicle moving device 12, 14 according to the present disclosure are easy to install and remove.

Figure 2B:
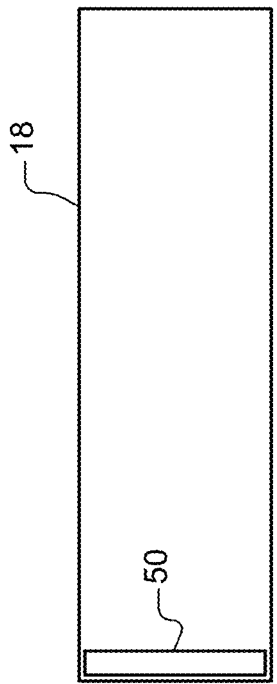
FIG. 2B is a plan view of another example of a sleeve according to the present disclosure.
Figure 2A:
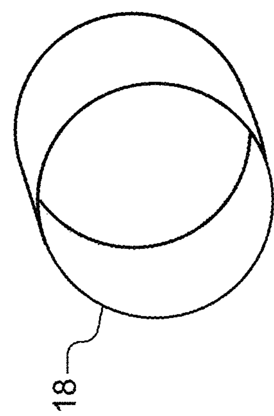
FIG. 2A is a perspective view of an example of a sleeve configured to be arranged adjacent to a radially outer surface of the tire according to the present disclosure.

Referring now to FIGS. 2A and 2B, examples of sleeves 18 of the disabled vehicle moving device 12, 14 are shown. In FIG. 2A, the sleeve 18 may include a continuous, flexible material having a cylindrical shape. The sleeve 18 is arranged over the wheel after it is lifted or raised.

In FIG. 2B, the sleeve 18 may include a rectangular shaped flexible material including an attaching device 50 to attached opposite ends of the sleeve 18 together. This approach allows variable tire diameters to be accommodated by the same sleeve 18. In some examples, the attaching device 50 includes a strip of adhesive, although other attaching devices may be used. In some examples, two-sided tape with a removable cover layer (not shown) is used.

In some examples, the sleeve 18 is made of vinyl, plastic, fabric, or other suitable material. In some examples, the sleeve 18 has a width that is approximately 1 inch wider than a tire tread and a length or circumference approximately equal to an inflated tire circumference. In some examples, the sleeve 18 includes a sewn joint, an adhesive joint or a fused joint.

Figure 3:
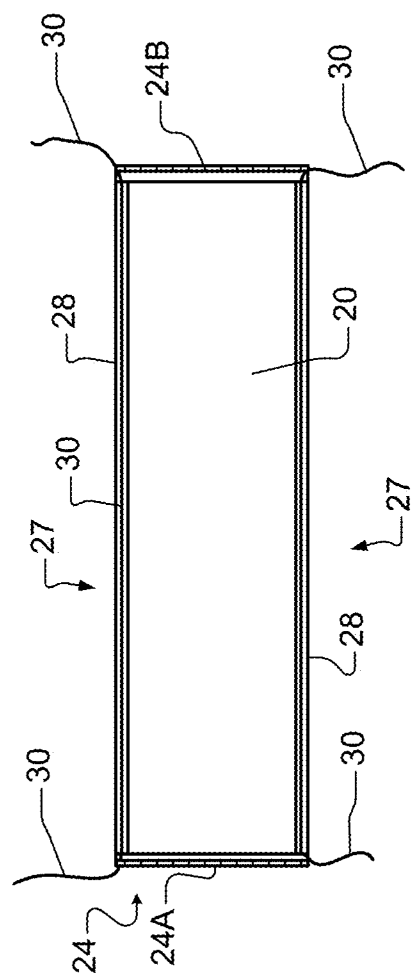
FIG. 3 is a plan view of an example of a cover to be arranged over the sleeve and the tire/wheel assembly according to the present disclosure.

Referring now to FIG. 3, an example of a cover 20 is shown. In some examples, the cover 20 includes a rectangular shaped, flexible material. In some examples, the cover 20 includes the connecting device 24 and the tightening device 27 to tighten the cover 20 around an outer circumference of the tire 16. In some examples, the collars 28 are formed on side surfaces of the cover 20. Strings 30 are arranged in and extend from opposite ends of the collars 28. After mounting the cover 20 over the sleeve 18 and the tire 16, opposite ends of the strings 30 are pulled tight and tied together to secure the cover 20 during subsequent rotation.

In some examples, the cover 20 is made of vinyl, plastic or another suitable material. In some examples, the width of the sleeve is approximately 4"×2(8") wider than the tire tread. In some examples, the length of the cover 20 is approximately equal to the inflated tire circumference plus approximately 2" to accommodate sleeve and tire/wheel assembly. In some examples, the zipper can be sewn on the opposite ends of the cover 20. In some examples, the collar 28 can be made of fabric or other suitable material that is sewn to edges of the cover 20. In some examples, the string 30 is threaded through the collar 28 to facilitate securing cover 20 around wheel/tire assembly. In some examples, the string 30 is made of polyolefin fiber (although other materials can be used) and the length is approximately equal to the length of tire circumference plus approximately 12". As used herein, approximately means+/−10%.

Figure 4:
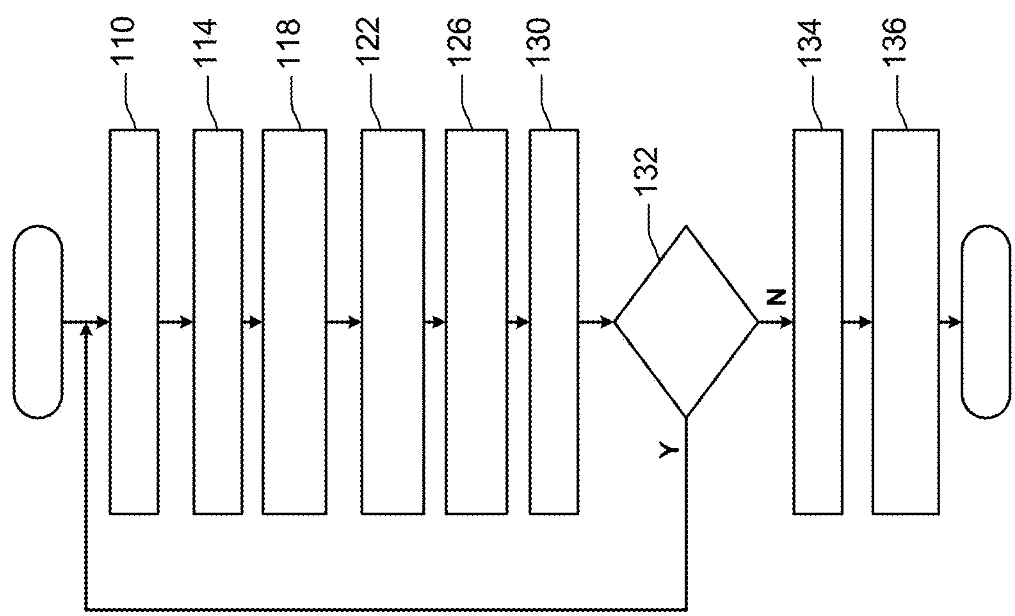
FIG. 4 illustrates a method for attaching the disabled vehicle moving device to one or more locked tire/wheel assemblies of the disabled vehicle according to the present disclosure.

Referring now to FIG. 4, a method 100 for attaching the disabled vehicle moving devices 12, 14 to wheels of the disabled vehicle 10 is shown. At 110, one or more tires of the disabled vehicle 10 are raised off the ground. At 114, the sleeve 18 is arranged over the radially outer surface of the tire 16. At 118, the cover 20 is partially arranged over the sleeve 18 and the tire/wheel assembly.

At 122, prior to connecting the cover 20 together, the lubricant 34 is applied over the exterior surface of the sleeve 18. In some examples, the lubricant includes a detergent/water solution or other lubricant is applied to the outer surface of the sleeve 18 before closing the cover 20. The lubricant 34 creates a reduced friction surface between the sleeve 18 and the cover 10 such that the lowered vehicle can easily be relocated over short distances as there is minimal rolling resistance between the sleeve 18 and the cover 20. In other examples, the lubricant 34 can be omitted if the materials of the cover 20 and the sleeve 18 are low friction.

At 126, the connecting device optionally connects opposite sides of the cover 20 together. At 130, the tightening device of the cover 20 is optionally tightened. At 132, the method returns to 110 if there are additional tires that are locked and need a disabled vehicle moving device to be attached. If 132 is false, the vehicle is ready to be moved at 134. At 136, after movement is complete, the disabled vehicle moving device(s) can be removed.

The disabled vehicle moving device according to the present disclosure is a low cost solution for moving the disabled vehicle 10 with one or more locked wheels to be moved without causing damage.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A disabled vehicle moving device configured to allow movement of a vehicle, comprising:

- a sleeve made of a flexible material and configured to be mounted over a radially outer surface of a tire/wheel assembly of the vehicle that is locked from rotation;
- a cover made of a flexible material and configured to be mounted over the sleeve and the tire/wheel assembly of the vehicle; and
- a lubricant arranged between the sleeve and the cover,
- wherein the cover rotates relative to the sleeve and the tire/wheel assembly to allow the vehicle to be moved.

2. The disabled vehicle moving device of claim 1, wherein the sleeve comprises a flexible material having an open cylindrical shape.

3. The disabled vehicle moving device of claim 1, wherein the sleeve comprises a flexible material having a rectangular shape and an attaching device to connect opposite ends of the sleeve around the radial outer surface of the tire/wheel assembly.

4. The disabled vehicle moving device of claim 1, wherein the cover includes a rectangular-shaped flexible material.

5. The disabled vehicle moving device of claim 4, wherein the cover includes first and second ends and first and second sides, and further comprising a connecting device located on at least one of the first end and the second end of the cover to connect the first end and the second end of the cover together around the tire/wheel assembly.

6. The disabled vehicle moving device of claim 5, wherein the connecting device comprises first and second mating connectors connected to the first end and to the second end of the cover, respectively.

7. The disabled vehicle moving device of claim 6, wherein the first and second mating connectors are selected from a group consisting of a zipper, a hook and loop fastener, and snaps.

8. The disabled vehicle moving device of claim 1, wherein the cover further comprises a tightening device configured to tighten the cover around the tire/wheel assembly.

9. The disabled vehicle moving device of claim 8, wherein the tightening device comprises first and second collars located along sides of the cover and first and second strings arranged in the first and second collars, respectively.

10. The disabled vehicle moving device of claim 1, wherein at least one of the sleeve and the cover is made of a material selected from a group consisting of vinyl and plastic.

11. A method for moving a disabled vehicle including at least one locked wheel, comprising:

- mounting a sleeve made of a flexible material over a radially outer surface of a tire/wheel assembly of the disabled vehicle that is locked from rotation;
- applying a lubricant to the sleeve;
- arranging a cover made of a flexible material over the sleeve and the tire/wheel assembly of the disabled vehicle; and
- moving the disabled vehicle,
- wherein the cover rotates relative to the sleeve and the tire/wheel assembly during movement.

12. The method of claim 11, wherein the sleeve comprises a flexible material having an open cylindrical shape.

13. The method of claim 11, wherein the sleeve comprises a flexible material having a rectangular shape and further comprising connecting opposite ends of the sleeve around the radial outer surface of the tire/wheel assembly.

14. The method of claim 11, wherein the cover includes a rectangular-shaped flexible material.

15. The method of claim 14, further comprising connecting opposite ends of the cover together around the tire/wheel assembly.

16. The method of claim 15, wherein connecting the opposite ends of the cover together around the tire/wheel assembly comprises connecting first and second mating connectors attached to opposite ends of the cover together.

17. The method of claim 16, wherein the first and second mating connectors are selected from a group consisting of a zipper, a hook and loop fastener, and snaps.

18. The method of claim 11, further comprising tightening the cover around the tire/wheel assembly.

19. The method of claim 18, wherein the cover includes first and second collars arranged along first and second sides thereof, respectively, and wherein the tightening comprises tying first and second strings arranged in the first and second collars, respectively, together.

20. The method of claim 11, wherein at least one of the sleeve and the cover is made of a material selected from a group consisting of vinyl and plastic.

* * * * *